Aug. 26, 1969 — H. E. TEMPLE — 3,463,344
BAKING PAN UNIT
Filed July 21, 1967
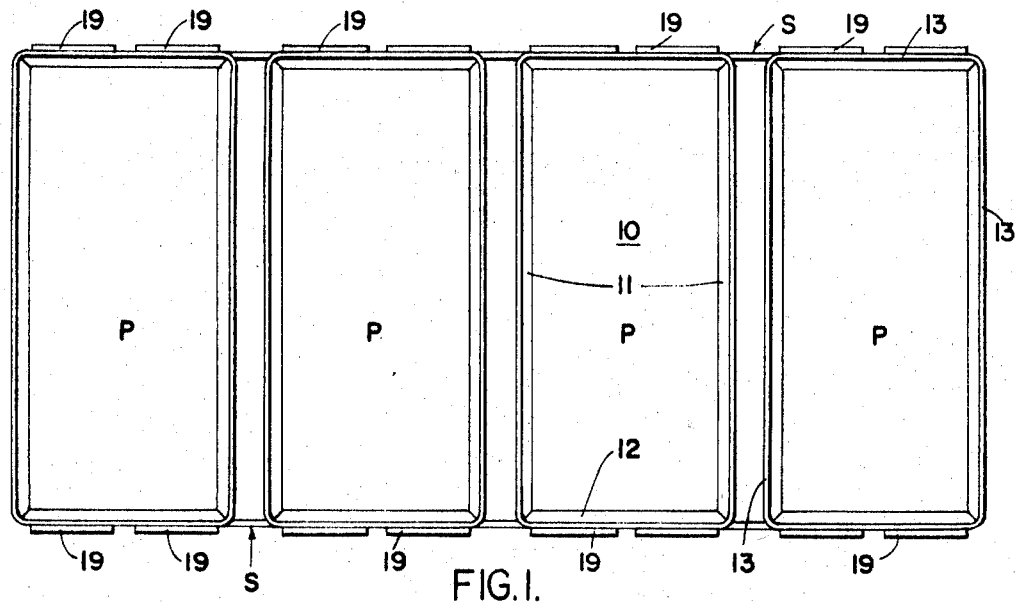
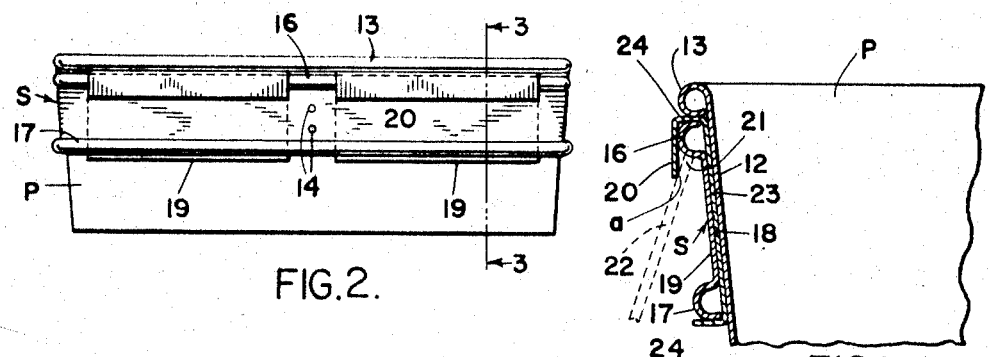
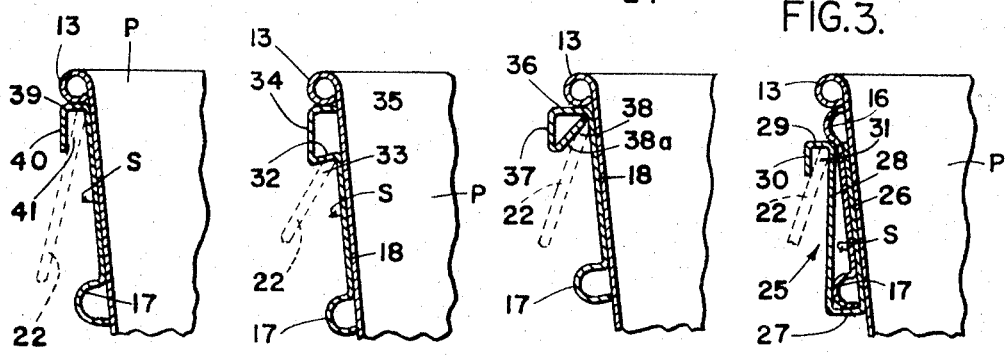
INVENTOR
HIRAM E. TEMPLE
BY
Learman, Learman & McCulloch

United States Patent Office 3,463,344
Patented Aug. 26, 1969

3,463,344
BAKING PAN UNIT
Hiram E. Temple, Saginaw, Mich., assignor to Baker Perkins Inc., Saginaw, Mich., a corporation of New York
Filed July 21, 1967, Ser. No. 655,028
Int. Cl. B65d 21/02
U.S. Cl. 220—23.2     13 Claims

ABSTRACT OF THE DISCLOSURE

A baking pan unit adapted for use with lift plate, stacking mechanism and comprising a plurality of parallelly arranged, upright baking pans connected by a pan strap assembly which includes a downwardly opening socket means for receiving upwardly extending lift plate members.

---

This invention relates to baking pans and more particularly to so-called "pan sets" which comprise a plurality of bake pans in parallel disposition, joined together by a connecting strap.

One of the prime objects of the present invention is to adapt or modify baking pan straps to provide them with downwardly opening socket means which permit the pan sets to be used with lift plate mechanism of a type which has been proposed for stacking pan sets one atop the other.

Another object of the invention is to adapt bake pan sets for use with lift plate mechanism in an economical manner which, as far as certain embodiments of the invention to be disclosed are concerned, does not require a revamping of pan sets already in existence.

Still another object of the invention is to design a baking pan set construction for the purpose outlined which is reliable in operation and does not add appreciably to the cost of a bakery pan handling system.

Other objects and advantages of the invention will be pointed out specifically or will become apparent from the following description when it is considered in conjunction with the appended claims and the accompanying drawings, in which:

FIGURE 1 is a top plan view of one embodiment of the invention in which insert plates are incorporated with the straps of existing pan sets;

FIGURE 2 is an end elevational view thereof;

FIGURE 3 is an enlarged, fragmentary, sectional view illustrating the construction of a pan set having insert elements;

FIGURE 4 is a view similar to FIGURE 3 and illustrating a modified form of insert plate member;

FIGURE 5 is a view similar to FIGURES 3 and 4 and illustrating still a further embodiment of the invention in which a downwardly opening socket is formed as a configurative portion of the connecting strap;

FIGURE 6 is a view similar to FIGURE 5 and illustrating another form of the invention in which the downwardly opening socket is also formed in the connecting strap;

FIGURE 7 is a view similar to FIGURES 5 and 6 illustrating still a further embodiment of the invention in which the downwardly opening socket is formed in a configurative portion of the connecting strap.

Referring now more particularly to the accompanying drawings, and in the first instance to FIGURES 1–3, conventional baking pans P are shown disposed in parallel relationship and connected by an enveloping pan strap generally designated S. The conventional pans P each include a bottom wall 10, side walls 11 and end walls 12 and it will be noted that the upper edges of the side and end walls are rolled over, as at 13, in the usual manner.

The connecting strap S, which may be riveted to each of the pans P as at 14, comprises upper and lower beaded or semicylindrical edges 16 and 17 connected my a mid- or central portion 18. Existing pans P and straps S in contemporary bakeries are of this construction and, so that existing pan sets need not be simply rendered obsolete when lifter plate mechanism is introduced to a given bakery, I have provided a form of insert plate, generally designated 19, in FIGURES 2 and 3, which includes a dependent flange 20 extending below the upper bead 16 of the strap member S and providing, with the upper bead portion 16 of the strap member S, a socket 21 in which a lift plate such as shown at 22 in chain lines may be received. In this embodiment of the invention, the lift plate 22 engages the bead 16 of the strap S but, since the bead does not provide a downwardly opening socket, it is necessary to also provide the flange 20, which is engaged by the plate 22 at a. Each insert plate inserted behind the strap S, a laterally extending portion 19 includes a back plate portion 23 which is slipped or 24 projecting between the beads 16 and 13, and a laterally extending foot portion 24 which positively maintains the insert plate 19 in position.

As FIGURE 2 indicates, a pair of plates 19 may be used at each end of a bakery pan P on opposite sides of the rivets 14, but it should be understood that, if desired, a single plate 19 might be used so long as it is centrally slotted so that it can be slipped past the rivets 14. In practice, assembly of the plates 19 described would be carried out at the factory by slipping them behind the strap S which, of course, has some flexibility, and then turning the portions 24 laterally after this has been accomplished to positively retain the insert plates 19 in position.

IN FIGURE 4 a modified insert plate generally designated 25 is disclosed, which comprises: a back or base portion 26 which may be readily slipped up behind the strap S, a laterally extending portion 27, an upwardly extending portion 28 which extends to the bottom of the semicylindrical upper bead portion 16, a laterally outwardly extending portion 29, and a dependent flange 30, the portions 28, 29 and 30 providing a socket 31 within which the lifter plate 22 may be received. Plates of this design may be placed in position at the bakery by simply sliding the base plate portions 26 up behind strap S.

In FIGURE 5 another embodiment of the invention is disclosed in which the pan strap S includes the lower bead portion 17 and linear midportion 18 but has a downwardly extending, inclined wall 32 forming, with the portion 18, a socket 33 for the lifter plate 22. The socket forming wall 32 connects with an upwardly extending wall 34 and a laterally inwardly extending wall 35, as shown.

In FIGURE 6 an embodiment of the invention somewhat similar to FIGURE 5 is shown wherein the upper end of the strap S includes a laterally outwardly extending portion 36, a vertically extending portion 37, and an inwardly and upwardly inclined portion 38 forming, with the midportion 18 of the strap S, a socket 38a in which the lifter plate 22 is received.

Finally, in FIGURE 7 the upper end of the strap S is shown as having a laterally outwardly extending portion 39 engaging the rolled over upper edge 13 of the pan P and provided with a dependent flange 40 which, with the portion 39 and portion 18, forms a socket 41 for reception of one of the lifter plates 22.

It will be observed that all embodiments of the invention provide a downwardly opening socket and it will be clear that existing pans may be modified or new pan straps S may be utilized to accomplished the result.

I claim:
1. A baking pan construction adapted for use with lift plate mechanism comprising:
a plurality of upright baking pans arranged in parallelism, each of said pans having side walls and a bottom;
and pan strap means extending exteriorly along said side walls to connect said pans together;
said pan strap means including:
outwardly and downwardly extending socket forming wall means projecting from at least one of said pans over substantially the length of said wall means to form downwardly opening socket means extending substantially the length of a pair of opposing walls of said pans for receiving upwardly extending lift plate members.

2. A baking pan construction as set forth in claim 1 wherein said downwardly opening socket means are formed along the upper edge of said pan strap means, and extending from each of said pans.

3. The combination defined in claim 1 in which the upper edges of said pans are rolled over and said pan strap means comprises a pan strap with a semicylindrical upper edge extending just below said rolled over upper edge extending just below said rolled over upper edges of the pans.

4. The combination defined in claim 3 in which said socket means is formed by a plate at each end having an anchoring section received between the pan and pan strap and a socket section comprising a portion extending out from the pan and formed with a downwardly directed terminal portion.

5. The combination defined in claim 1 in which the pan strap means comprises a pan strap having a downwardly extending portion forming a wall of said socket means.

6. The combination defined in claim 5 in which the downwardly extending portion is downwardly inclined.

7. The combination defined in claim 6 in which the upper edge of said pan strap means comprises a bead and the downwardly extending portion is the generally lateral lower wall thereof.

8. The combination defined in claim 7 in which the upper edge of said pan strap means comprises a bead and the downwardly extending portion is the outer side wall thereof.

9. A baking pan construction adapted for use with a lift plate mechanism comprising:
a plurality of adjacent upright baking pans each having side walls and a bottom;
and pan strap means including a pan strap extending along the walls of said pans for connecting said pans together; and
an insert plate having a first portion extending between said pan strap and a second portion formed to provide socket means for receiving said lift plate mechanism.

10. A baking pan construction adapted for use with lift plate mechanism comprising:
a plurality of upright baking pans arranged in parallelism, each of said pans having upper edges which are rolled over;
pan strap means extending around the side walls of said pans to connect them together;
said pan strap means including:
a pan strap with a semicylindrical upper edge extending just below said rolled over upper edges of the pans, and
downwardly opening socket means for receiving upwardly extending lift plate members, said socket means being formed by a plate at each end having an anchoring section received between the pan and pan strap and a socket section comprising a portion extending out between said rolled over edges of the pan and the semicylindrical edge of the pan strap and formed with a downwardly directed terminal portion comprising a flange extending downwardly in engagement with said semicylindrical edge to a point below said semicylindrical edge.

11. A baking pan construction adapted for use with lift plate mechanism comprising:
a plurality of upright baking pans arranged in parallelism having upper edges which are rolled over;
pan strap means extending around the side walls of said pans to connect them together;
said pan strap means including:
a pan strap having semicylindrical upper and lower edges,
and downwardly opening socket means for receiving upwardly extending lift plate members, said socket means comprises a plate having an ananchoring section extending up between said pan strap and the pan, and a section extending upwardly along said pan strap and having a socket formed on its upper end comprising a portion extending outwardly in engagement with the upper edge of the pan strap and having a dependent terminal flange thereon.

12. A baking pan construction adapted for use with lift plate mechanism comprising:
a plurality of upright baking pans arranged in parallelism, each of said pans having side walls and a bottom;
and pan strap means extending exteriorly along said side walls to connect said pans together;
said pan strap means including an outwardly and downwardly extending socket forming wall means including an overlying portion having an outer section spaced from the portion of the pan strap means it overlies for receiving upwardly extending lift plate members.

13. A baking pan construction as set forth in claim 12 wherein said outer portion is a terminal edge.

References Cited

UNITED STATES PATENTS

| | | | |
|---|---|---|---|
| 1,009,227 | 11/1911 | Rozier | 294—27 X |
| 1,483,637 | 2/1924 | Katzinger | 294—27 |
| 2,323,922 | 7/1943 | Langel | 220—23.2 |

GEORGE E. LOWRANCE, Primary Examiner

U.S. Cl. X.R.

294—27